July 17, 1934.   G. G. MORENO   1,966,803
LIGHT CONTROL FOR CAMERAS
Filed April 18, 1931   3 Sheets-Sheet 1
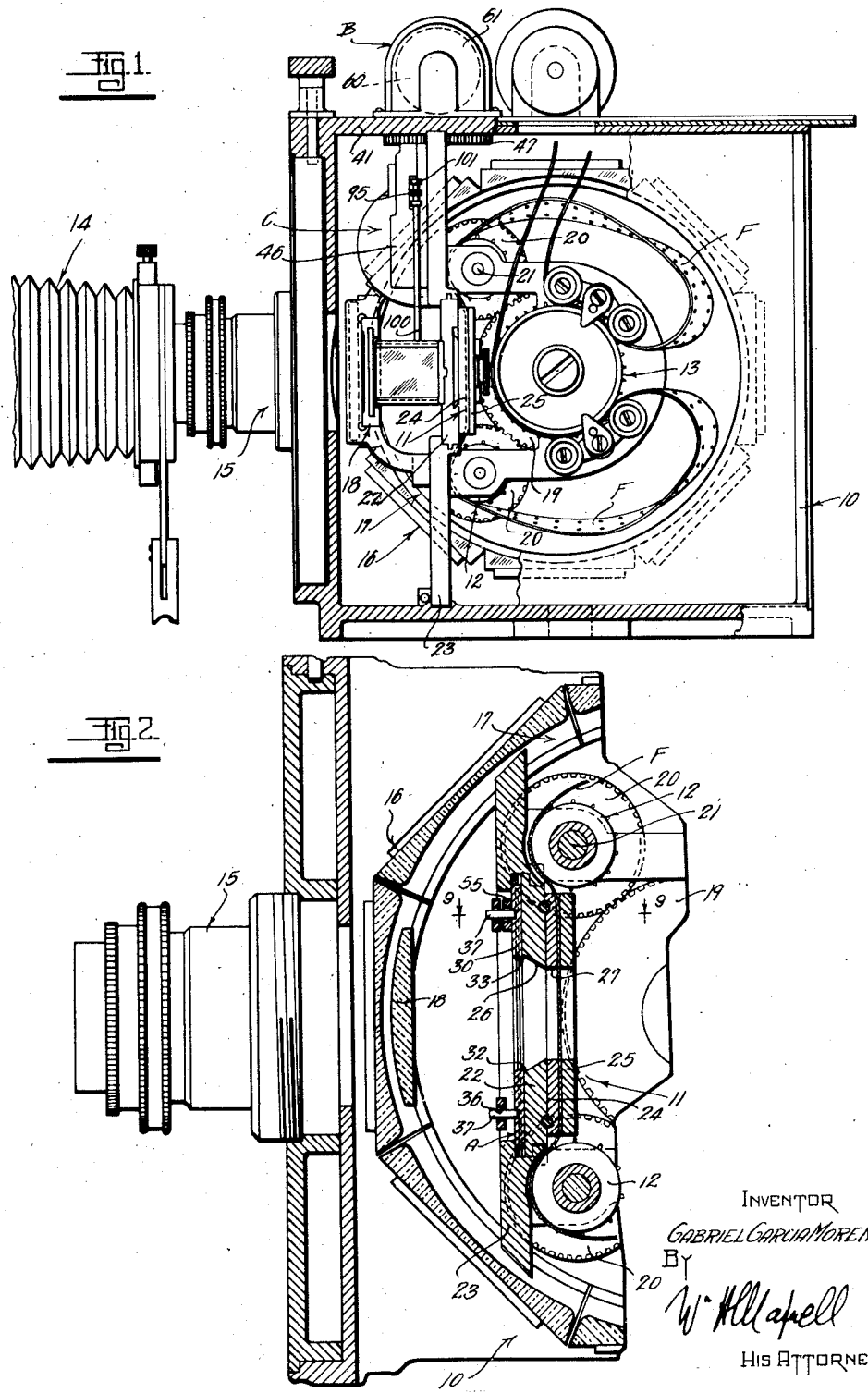
INVENTOR
GABRIEL GARCIA MORENO
BY
HIS ATTORNEY

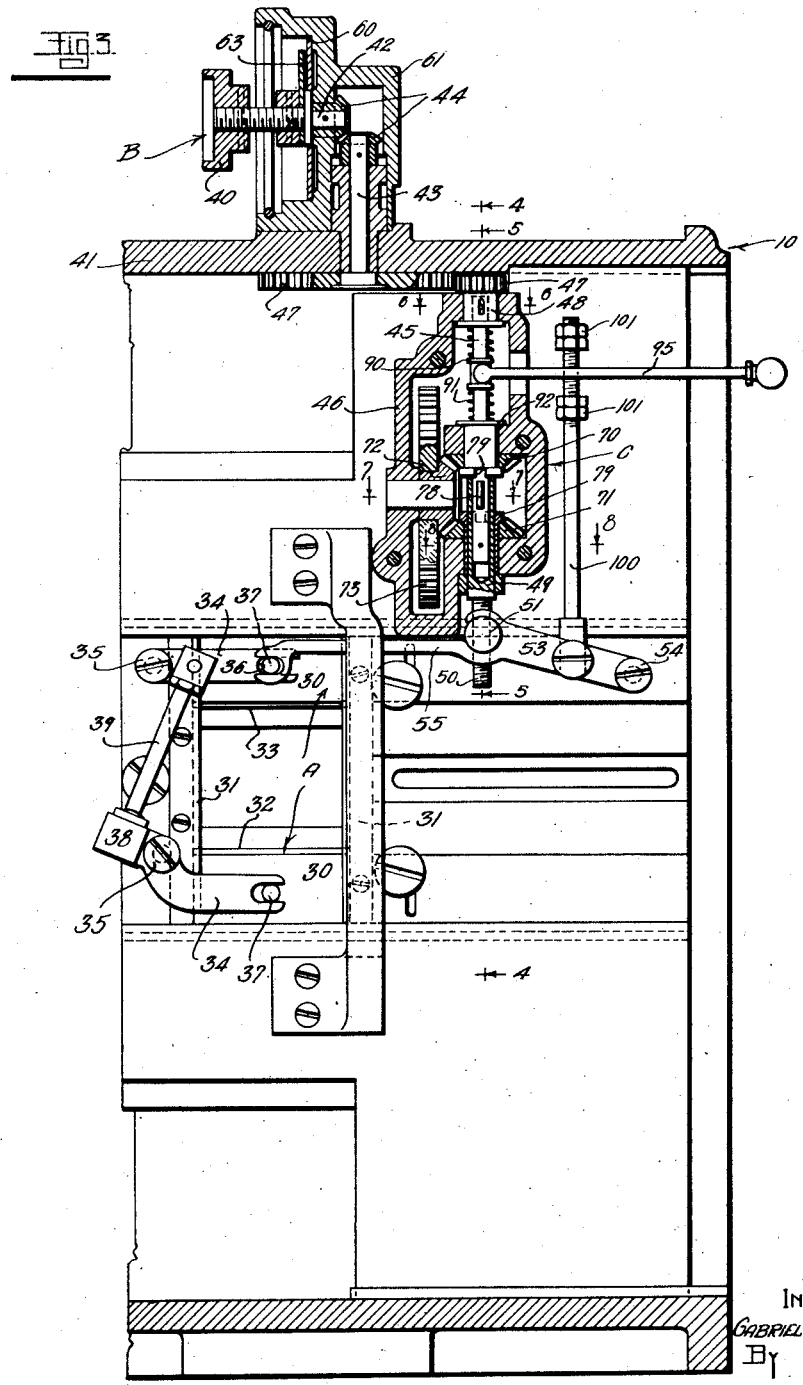

July 17, 1934.  G. G. MORENO  1,966,803
LIGHT CONTROL FOR CAMERAS
Filed April 18, 1931   3 Sheets-Sheet 3
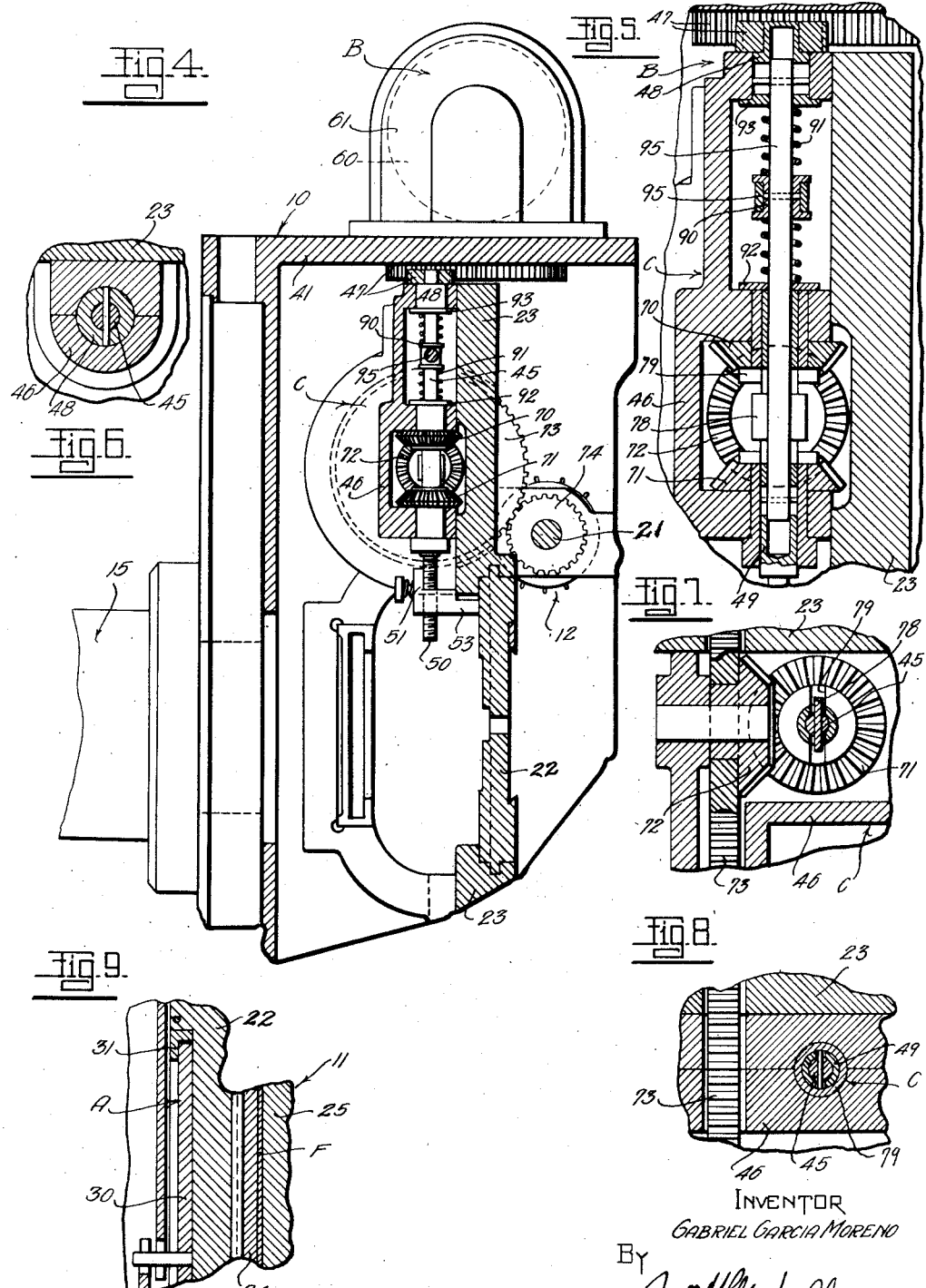
INVENTOR
GABRIEL GARCIA MORENO
BY
His ATTORNEY Patented July 17, 1934

1,966,803

UNITED STATES PATENT OFFICE 1,966,803

LIGHT CONTROL FOR CAMERAS

Gabriel García Moreno, Los Angeles, Calif., assignor to Moreno-Snyder Cine Corporation, Ltd., Los Angeles, Calif., a corporation of Delaware Application April 18, 1931, Serial No. 531,202

12 Claims. (Cl. 88—16.8)

This invention has to do with a light control for motion picture apparatus, the device of the present invention being particularly practical and useful as applied to cameras of the continuous exposure type. It is a general object of the present invention to provide an effective, practical device for regulating light in a camera, or the like, of the type in which the film moves continuously.

In cameras of the continuous type, i. e., of the type in which the film is operated continuously and the optical system functions to move the light in synchronism with the film, difficulty has been experienced in framing or definitely fixing the size of the images obtained and in regulating the exposure or amount of light admitted to the film.

The present invention is particularly concerned with a device for regulating the exposure or amount of light admitted to the film in a camera of the type in which the film moves continuously. The invention may be applied to cameras of various designs and constructions and, in applying it to different cameras, variations may occur in the formation, construction, and relationship of parts. For purpose of example, and in order to facilitate an understanding of a typical and practical application of the invention, I have disclosed a single preferred form of the invention applied to a camera in which the film moves continuously, such as is the subject of my co-pending application entitled Motion picture optical system and apparatus, Serial Number 531,200, filed April 18, 1931.

It is a primary object of the present invention to provide a device that operates to effectively regulate light passing to the film in a camera of the type in which the film moves continuously without interfering with the framing or the configuration of the image obtained on the film.

It is another object of this invention to provide a light-regulating means of the character mentioned including two light-controlling shutters operatively connected to operate in opposite directions so that the light-regulating device is always balanced or centrally located relative to the optical system.

A further object of the present invention is to provide various features in the control or operating means for the light-regulating parts. By the present invention the light-regulating means may be operated manually to any desired position to remain set in such position until further deliberately operated, or may be connected with the mechanism of the camera to operate in synchronism therewith in case it is desired to gradually open or close the regulating means in synchronism with the action of the camera.

The various objects and features of my invention will be best and more fully understood from the following detailed description of a typical form and application of the invention, throughout which description reference will be had to the accompanying drawings, in which:

Fig. 1 is a side view of a camera of the type in which the film is moved continuously, being a view taken immediately inside of one of the side walls of the camera body in order to show the general arrangement of parts in the camera. Fig. 2 is an enlarged vertical detailed sectional view taken through the film guide of the camera, showing the relationship of the light-regulating means of the present invention to the film guide. Fig. 3 is an enlarged transverse sectional view of part of the camera, showing the general arrangement and combination of parts provided by the present invention. Fig. 4 is a sectional view taken as indicated by line 4—4 on Fig. 3, certain of the parts being shown in elevation. Fig. 5 is an enlarged detailed sectional view taken as indicated by line 5—5 on Fig. 3. Fig. 6 is an enlarged detailed transverse sectional view taken as indicated by line 6—6 on Fig. 3. Fig. 7 is an enlarged detail transverse sectional view taken as indicated by line 7—7 on Fig. 3, and Fig. 8 is an enlarged detailed transverse sectional view taken as indicated by line 8—8 on Fig. 3. Fig. 9 is a sectional view taken as indicated by line 9—9 on Fig. 2.

The camera illustrated throughout the drawings includes, generally, a box-shaped body 10, a film guide 11 located in the body, film-advancing sprockets 12 for operating film F through the guide 11, a film-feeding sprocket 13 for feeding film F to and from the sprockets 12, and various other parts including an optical system.

The optical system of the camera includes, generally, an objective lens 15 at the front of the body 10 in line with or opposite the film guide 11, a mat box 14 in front of the lens 15, lens elements 16 carried by a rotor or revolving lens carrier 17 so that they are in an annular series and are operated successively through the light passing from the lens 15 to the film F in the guide 11, and a corrective lens 18 located between the film supported in the guide 11 and the point in the optical system where the lens elements 16 intersect the system. The lens elements 16 are designed so that, as they are moved vertically through the axis of the optical system, they deflect the light, causing the image-bearing shaft or shafts of light falling upon the film F to move in synchronism with the film. The film F is moved continuously through the gate 11 by the continuously operating sprockets 12. The sprockets 12 are moved continuously and in synchronism with the lens carrier 17 through a driving connection which includes a drive pinion 19 concentric with and operated by the lens carrier 17 and gears 20 on the shafts 21 of the sprockets 12 meshing with the pinion 19. The mat or aperture member in the mat box 14 determines the frame or size of the image obtained on the film F. The lens 15 may be an ordinary photographic lens such as is employed in motion picture cameras, while the corrective lens 18 is such as to neutralize enlargement and distortions which are created by the lens elements 16 in their action in moving the light in synchronism with the movement of the film.

The film guide 11 is carried by a base plate 22 detachably mounted in a partition-like part 23 within the body. The film guide includes a guide plate 24 mounted at the rear face of the base plate, and a gate 25 which operates to hold the film F in proper position with reference to the guide plate 24. The base plate 22 and film-guiding plate 24 have registering apertures 26 and 27, respectively, in line with the optical system to admit light to the film F. The apertures 26 and 27 are sufficiently wide to accommodate the maximum width of the frame determined by the mat of the mat box 14 and are sufficiently long or are of sufficient extent longitudinally of the film to accommodate maximum exposure of the film permitted by the optical system.

The mechanism provided by the present invention includes, generally, light-regulating means A, means B for manually controlling the means A to operate the means A to any desired position or condition of adjustment, and means C connecting the means A to the camera mechanism proper, i. e., to the film-moving mechanism of the camera so that the means A is operable in synchronism with the film of the camera.

The light-regulating means A is located in front of the film F carried by the guide 12 and is preferably located immediately in front of the film. In the preferred arrangement illustrated in the drawings the means A is located at the front of the base plate 22, as shown throughout the drawings. The means A is in the form of a shutter mechanism and, in accordance with the invention, includes one or more shutters for varying the vertical or longitudinal extent of the opening admitting light to the film F. In the preferred form of the invention, the means A includes two shutters 30 mounted in guideways 31 at the front of the base plate 22 so that they are movable vertically or in a direction longitudinally of the film F. The shutters extend completely across the openings 26 and 27 and are preferably formed with straight parallel opposing edges 32 and 33 which operate to define the upper and lower limits of the openings through which light passes to the film.

The shutters 30 are interconnected to operate in opposite directions so that the exposure aperture or opening through which light is admitted to the film is always balanced and centrally located with reference to the axis of the optical system of the camera. In the mechanism illustrated in the drawings levers 34 are pivotally mounted on the base plate 22 by means of pivot pins 35 and have their outer ends yoked at 36 to slidably engage lugs or projections 37 on the shutters 30. The lever 34 connected with the lower shutter 30 has an arm 38 extending from the pivotal mounting in a direction opposite to the arm which is yoked to receive the projection 37. A connecting link 39 connects the arm 38 with the lever 34 connected with the upper shutter 30 at a point between the pivotal mounting and the point of engagement of said arm with the shutter. Through this mechanism, which is clearly illustrated in Fig. 3, the shutters when moved operate in opposite directions.

It will be obvious from inspection of the drawings that various devices or arrangements may be provided for engaging a suitable part of the mechanism just described in order to move or operate the shutters in the desired manner. In the drawings I have illustrated a means B for manually operating the mechanism just described. The operating means B includes primarily a manually-operable member, such as a knob 40, and a connection between the knob and one of the shutters or a part of the mechanism connecting the shutters so that the shutters are operated when the knob 40 is moved. In the particular case illustrated the manually-operable knob 40 is located above the top 41 of the camera body 10 on a shaft 42. The shaft 42 is operatively connected with a countershaft 43 through meshing bevel gears 44. The countershaft 43 extends downwardly through a suitable bearing into the upper portion of the camera body 10.

A vertical drive shaft 45 is located in the camera body within a suitable housing 46 and is driven from the counter-shaft 43 through meshing gears 47. The upper end of the drive shaft is slidably keyed or pinned to the hub 48 of the gear 47 allowing the shaft 45 to be moved vertically at the same time maintaining driving connection between the gear 47 and the shaft. The lower end portion of the shaft 45 is slidably keyed or pinned to the shank 49 of a screw 50. The shank 49 of the screw is rotatably supported at the lower portion of the housing 46, while the screw 50 projects downwardly from the housing 46. The screw 50 operates through a nut 51 which is connected to a pivotally-mounted lever 53. The lever 53 is pivotally carried on a pivot pin 54 and has an extension or arm 55 beyond the nut 51 which engages the upper shutter 30 of the light-regulating means A. The outer end of the arm 55 is yoked and engages the projection 37 on the upper shutter 30.

With the mechanism just described, rotation of the operating knob 40 causes operation of the countershaft 43 through the gears 44. Operation of the countershaft 43 acts through gears 47 to drive the drive shaft 45 which, through the sliding drive connection with the shank 49, drives the screw 50. As the screw rotates, the nut 51 is operated vertically causing the lever 53 to swing or turn about the pivot pin 54. As the lever 53 moves, the outer end of the arm 55 of the lever causes movement of the shutters through its engagement with the upper shutter 30.

In practice a suitably-graduated dial 60 is provided on the support 61 that carries the shaft 42, and an indicating hand 63 is provided on the shaft 42 to cooperate with the dial to indicate to the operator the operative position of the shutters.

The means C, which connects the light-regulating means A to the mechanism of the camera, acts through certain of the parts just described, for instance, through the screw 50 and the connection between the screw 50 and the shutters. The means C includes, generally, two elements 70 and 71 mounted in spaced relation around the shaft 45 to be driven in opposite directions from the mechanism of the camera. In the preferred form of the invention illustrated, the elements 70 and 71 are in the nature of bevel gears which mesh with diametrically opposite points of a driving gear 72 operatively connected with one of the working parts of the camera through a gear 73. In the case illustrated the gear 73 is fixed to the driving gear 72 and meshes with a pinion 74 fixed on the shaft 21 carrying the upper film-operating sprocket.

A clutching mechanism is provided for connecting either of the oppositely-rotating gears 70 and 71 with the drive shaft 45. In the construction illustrated, a clutch lug 78 is provided on the shaft 45 to cooperate with clutch jaws 79 on the opposing ends of the gear elements 70 and 71. Suitable means is provided for normally maintaining the clutch lug 78 in a neutral position out of engagement with the clutch jaws 79 but allowing the shaft to be shifted either up, so that the lug 78 engages and meshes with the jaws 79 of the gear 70, or down, so that it engages or meshes with the jaws 79 of the gear 71. The means illustrated for normally holding the shaft 45 in a position where the clutch lug is in the neutral position includes a collar 90 fixed on the shaft and balanced compression springs 91 engaging opposite sides of the collar. The springs act between fixed abutments 92 and 93 on the collar 90.

For the purpose of shifting the shaft 45 in order to engage the clutch lug 78 with the clutch jaws on the desired gear, an operating arm 95 is provided to engage the collar 90 on the shaft 45. The operating arm 95 projects through an opening in the body 10 so that it is operable from the exterior of the body. It will be obvious from inspection of Fig. 3 of the drawings how the operator may engage the operating arm 95 to shift the shaft 45 either up or down to actuate the clutching device just described.

When the shaft 45 is moved longitudinally to actuate the clutching device, it is driven from the mechanism of the camera through the gear 73, gear 72, and the gear to which it is clutched. As the shaft 45 is thus operated from the mechanism of the camera, the screw 50 is rotated with the shaft 45 causing the nut 51 to move and the shutters to be operated through the connection above described. The gears 70 and 71, being operated in opposite directions as above described, enable the operator to effect driving of the shutters 30 from the mechanism of the camera in either direction, i. e., either together or apart.

The invention provides a control for stopping or disengaging the drive just described in order to prevent over-travel or actuation of parts beyond the desired positions, or the fully-operated positions. The control illustrated in the drawings includes a control link 100 pivotally connected to the lever 53 at a suitable distance removed from the pivot pin 54 which carries the latch 53. The link 100 extends upwardly to the arm 95 where it is provided with stops 101 above and below the arm. The parts are related so that when the arm 95 is shifted upwardly the engagement of the mechanism is such as to cause the shutters 30 to be moved together to close or shut down the light opening. During this movement of the mechanism the control link 100 is moved downwardly. The upper stop 101 on the control link is located to engage the arm 95 and move it out of clutching position upon the shutters reaching the fully-closed position. When the mechanism is to be engaged to move the shutters 30 apart, the control arm 95 is shifted downwardly and, as the mechanism operates, the lever 53 moves upwardly. The lower stop 101 on the control link 100 is located to engage the arm 95 and shift it out of clutching position upon the shutters 30 reaching the full open position.

Having described only a typical preferred form of my invention, I do not wish to limit myself to the specific details set forth, but wish to reserve to myself any changes or variations that may appear to those skilled in the art or fall within the scope of the following claims:

Having described my invention, I claim:

1. In motion picture apparatus, an optical system including a continuously moving lens unit, a film-moving mechanism for moving a film continuously in synchronism with the lens unit, a light-regulating shutter shiftable parallel with the direction of movement of the film, means operable to shift the shutter, and a driving connection between the film-moving mechanism and said means, said connection including two elements driven in opposite directions by said mechanism, a member operatively connected with the shutter, and a clutch for operatively connecting said member with either of said elements.

2. In motion picture apparatus, an optical system including a continuously moving lens unit, a film-moving mechanism for moving a film continuously in synchronism with the lens unit, a light-regulating shutter shiftable parallel with the direction of movement of the film, means operable to shift the shutter, and a driving connection between the film-moving mechanism and said means, said connection including a shaft operatively connected with the shutter, two members free on the shaft driven in opposite directions by said mechanism, and a clutch for operatively connecting the shaft with either of said members.

3. In motion picture apparatus, an optical system including a continuously moving lens unit, a film-moving mechanism for moving a film continuously in synchronism with the lens unit, a light-regulating shutter shiftable in a direction parallel with the direction of movement of the film, means operable to shift the shutter, a driving connection between the film-moving mechanism and said means, said connection including a shaft operatively connected with the shutter, two members free on the shaft driven in opposite directions by said mechanism, and a clutch for operatively connecting the shaft with either of said members, and means for manually operating said shaft.

4. In motion picture apparatus, an optical system including a continuously moving lens unit, a film-moving mechanism for moving a film continuously in synchronism with the lens unit, a light-regulating shutter shiftable in a direction parallel with the direction of movement of the film, means operable to shift the shutter, and a driving connection between the shutter, and a driving connection between the film-moving mechanism and said means, said connection including a control for disengaging the connection upon the shutters being operated to a predetermined position.

5. In motion picture apparatus, an optical system including a continuously moving lens unit, a film-moving mechanism for moving a film continuously in synchronism with the lens unit, a light-regulating shutter shiftable in a direction parallel with the direction of movement of the film, means operable to shift the shutter, and a driving connection between the film-moving mechanism and said means, said connection including, a driving member, two drive elements, a clutch for operatively connecting said member with either of said elements, and a control for disengaging the clutch upon the shutter being operated to a predetermined position.

6. In motion picture apparatus, means operating a film continuously in a longitudinal direction, an optical system handling light in synchronism with the film, light-regulating shutters normally stationary and spaced to pass light, a connection between the shutters whereby they operate simultaneously in opposite directions longitudinally of the film, and an operating connection between the film operating means and shutters including, two elements driven in opposite directions by the film operating means, a member operatively connected with the shutters, and a manually controlled clutch for operatively connecting said member with either of said elements.

7. In motion picture apparatus, means operating a film continuously in a longitudinal direction, an optical system handling light in synchronism with the film, light-regulating shutters normally stationary and spaced to pass light, a connection between the shutters whereby they operate simultaneously in opposite directions longitudinally of the film, and an operating connection between the film operating means and shutters including, a shaft operatively connected with the shutters, two elements free on the shaft and driven in opposite directions by the film operating means, and a clutch for operatively connecting the shaft with either of said elements.

8. In motion picture apparatus, means operating a film continuously in a longitudinal direction, an optical system handling light in synchronism with the film, light-regulating shutters normally stationary and spaced to pass light, a connection between the shutters whereby they operate simultaneously in opposite directions longitudinally of the film, and an operating connection between the film operating means and shutters including, a shaft operatively connected with the shutters, means for manually operating the shaft, two elements free on the shaft and driven in opposite directions by the film operating means, and a clutch for operatively connecting the shaft with either of said elements.

9. In motion picture apparatus, means operating a film continuously in a longitudinal direction, an optical system handling light in synchronism with the film, light-regulating shutters normally stationary and spaced to pass light, a connection between the shutters whereby they operate simultaneously in opposite directions longitudinally of the film, and an operating connection between the film operating means and shutters including, a shaft operatively connected with the shutters, two elements free on the shaft and driven in opposite directions by the film operating means, a clutch for operatively connecting the shaft with either of said elements, and a control disengaging the clutch upon the shutters being operated to a predetermined position.

10. In motion picture apparatus, means operating a film continuously in a longitudinal direction, an optical system handling light in synchronism with the film, light-regulating shutters normally stationary and spaced to pass light, a connection between the shutters whereby they operate simultaneously in opposite directions longitudinally of the film, and an operating connection between the film operating means and shutters including, a shaft operatively connected with the shutters, means for manually operating the shaft, two elements free on the shaft and driven in opposite directions by the film operating means, a clutch for operatively connecting the shaft with either of said elements, and a control disengaging the clutch upon the shutters being operated to a predetermined position.

11. In motion picture apparatus, an aperture plate, a film moving mechanism for moving a film continuously at the aperture plate, a shiftable light regulating shutter shiftable parallel with the direction of movement of the film, means operable to shift the shutter, and a releasable driving connection between the film moving mechanism and said means, said connection being operable to cause shifting of the shutter in either direction.

12. In motion picture apparatus, a fixed aperture plate, a film moving mechanism operating a film at the aperture plate, a shiftable light-regulating shutter normally positioned to admit light to the film continuously, means operatable to shift the shutter in a direction parallel to the direction of movement of the film, and a releasable driving connection between the film moving mechanism and said means.

GABRIEL GARCÍA MORENO.